United States Patent
Kurtz et al.

(10) Patent No.: US 7,283,922 B2
(45) Date of Patent: Oct. 16, 2007

(54) TRANSDUCER EMPLOYING WIRELESS TRANSMISSIONS FOR SENDING AND RECEIVING SIGNALS

(75) Inventors: Anthony D. Kurtz, Ridgewood, NJ (US); Wolf S. Landmann, Fair Lawn, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 18 days.

(21) Appl. No.: 11/003,238

(22) Filed: Dec. 3, 2004

(65) Prior Publication Data
US 2005/0150286 A1    Jul. 14, 2005

Related U.S. Application Data

(60) Provisional application No. 60/535,966, filed on Jan. 12, 2004.

(51) Int. Cl.
*G01L 7/00* (2006.01)
(52) U.S. Cl. ...................................................... 702/138
(58) Field of Classification Search ................ 702/138, 702/130, 133, 41, 33; 340/825.71, 825.72, 340/825.73
See application file for complete search history.

(56) References Cited

U.S. PATENT DOCUMENTS

| | | | | |
|---|---|---|---|---|
| 6,248,083 B1 * | 6/2001 | Smith et al. | ................. | 600/585 |
| 6,359,444 B1 * | 3/2002 | Grimes | ....................... | 324/633 |
| 2002/0045921 A1 * | 4/2002 | Wolinsky et al. | .............. | 607/61 |
| 2002/0177782 A1 * | 11/2002 | Penner | ........................ | 600/485 |
| 2003/0118199 A1 * | 6/2003 | Marquis et al. | ................ | 381/79 |

* cited by examiner

*Primary Examiner*—Bryan Bui
*Assistant Examiner*—Aditya S. Bhat
(74) *Attorney, Agent, or Firm*—Plevy, Howard & Darcy, PC

(57) ABSTRACT

A transducer is implemented to operate with transmitted frequency signals. These transmitted signals provide a bias potential to the transducer and enable the transducer to transmit a transducer output signal to a remote location. The transducer has an antenna for receiving transmitted signals. The antenna is coupled to a rectifier circuit; the rectifier circuit is operative to provide a DC voltage in response to said received transmitted signals. This DC voltage is applied to the piezoresistive array via a switching arrangement coupled between the array and the rectifier circuit. An interface circuit controls the switching arrangement to enable DC bias to be applied to the array in a first mode and to remove the bias in a second mode.

7 Claims, 1 Drawing Sheet

TRANSDUCER EMPLOYING WIRELESS TRANSMISSIONS FOR SENDING AND RECEIVING SIGNALS

CLAIM FOR PRIORITY

This application claims priority from U.S. provisional patent application Ser. No. 60/535,966 filed on Jan. 12, 2004, the subject matter thereof being incorporated by reference herein in its entirety.

FIELD OF THE INVENTION

The present invention relates to transducers in general and, more particularly, to a transducer which employs wireless transmissions for sending and receiving signals. The received signals operate to provide a bias to the transducer assembly, therefore eliminating the need for batteries or an external power supply.

BACKGROUND OF THE INVENTION

Transducers are widely employed for monitoring various environmental conditions. A very popular type of transducer is the pressure transducer. Such pressure transducers are well known and conventionally employed piezoresistive devices arranged in a Wheatstone bridge configuration which is coupled to an operating biasing source, such as a voltage supply or a battery. The transducers are usually hard-wired into a circuit, whereby the output of the pressure transducer is monitored to provide a voltage indicative of a pressure applied thereto. Many of the transducers employed utilize piezoresistive sensors or piezoresistive devices, which produce an output voltage according to an applied pressure. As indicated, these are well known and the assignee herein, Kulite Semiconductor Products, Inc., commercially sells such devices in a plurality of different configurations.

It is extremely desirable to provide a transducer which would be connected to a monitoring station using a wireless link. In this manner, the monitoring station can transmit a signal to the sensor. The signal can be used by the sensor to provide an operating potential. The sensor can also transmit an output signal to the monitoring station indicative of a measured pressure. In this manner, one eliminates the need for a sensor or a transducer which is hard wired into a circuit and further eliminates the need for a sensor which requires the use of a battery or an operating potential.

SUMMARY OF THE INVENTION

A transducer is implemented to operate with transmitted frequency signals. These transmitted signals provide a bias potential to the transducer and enable the transducer to transmit a transducer output signal to a remote location. The transducer has an antenna for receiving transmitted signals. The antenna is coupled to a rectifier circuit; the rectifier circuit is operative to provide a DC voltage in response to said received transmitted signals. This DC voltage is applied to the piezoresistive array via a switching arrangement coupled between the array and the rectifier circuit. An interface circuit controls the switching arrangement to enable DC bias to be applied to the array in a first mode and to remove the bias in a second mode. The interface circuit further includes a converter circuit for converting the bridge output into an RF signal for transmission through the same antenna back to a remote location. In this manner the transducer requires no operating voltage as it receives the operating voltage from the transmitted signals.

DETAILED DESCRIPTION OF THE INVENTION

Figure 1:
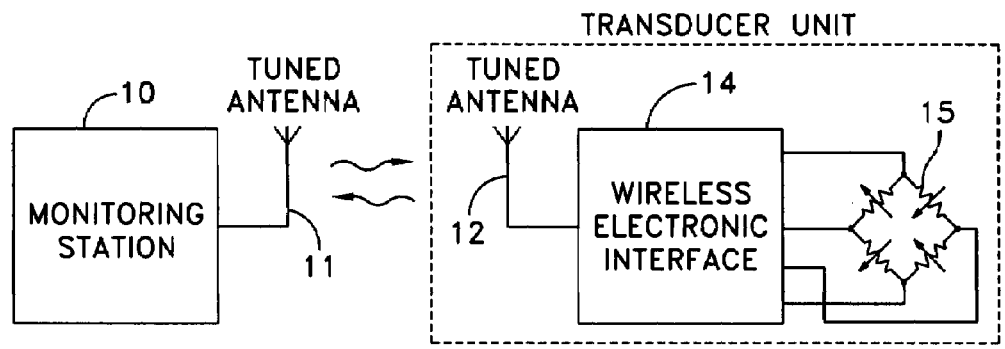
FIG. 1 is a simple block diagram of a wireless transducer according to this invention.

Referring to FIG. 1, there is shown a basic block diagram of a system according to an embodiment of the present invention. A monitoring station 10 transmits a radio signal which may be in the UHF band. The signal can be transmitted at a relatively low level. The choice of the UHF frequency band is desirable because it is in one of the unregulated frequency bands around 400 MHZ or 900 MHZ. This choice was made because the antennas for this range are very small and signal propagation is not affected by rain or humidity in the atmosphere. As shown, the monitoring station 10 includes an antenna 11. As is well known, the antenna 11 can conventionally operate in a transmit or receive mode.

A transducer unit comprising a tuned antenna 12, bridge 15, and interface 14 is in operative communication with monitoring station. In one configuration, tuned antenna 12 associated with the transducer unit comprises a printed circuit coil and capacitor. These form a resonant circuit at the operating frequency. The tuned antenna 12 is coupled to wireless electronic interface 14, which as illustrated, is coupled to piezoresistive bridge 15. The bridge 15 is a Wheatstone bridge configuration and includes piezoresistive devices, which basically change their resistance according to an applied pressure.

In operation, the monitoring station transmits a frequency which is received by the tuned antenna 12. The tuned antenna 12 is coupled to a wireless electronic interface, whereby the signal transmitted is rectified to produce a DC voltage, which DC voltage operates to bias the circuitry, as well as the bridge 15. The bridge 15, when biased, will measure an applied pressure. The applied pressure measured by the bridge is then converted into voltage, which voltage may be converted into a digital signal, which signal is again transmitted by the tuned antenna 12 back to the monitoring station which receives the signal via its antenna 11.

Figure 2:
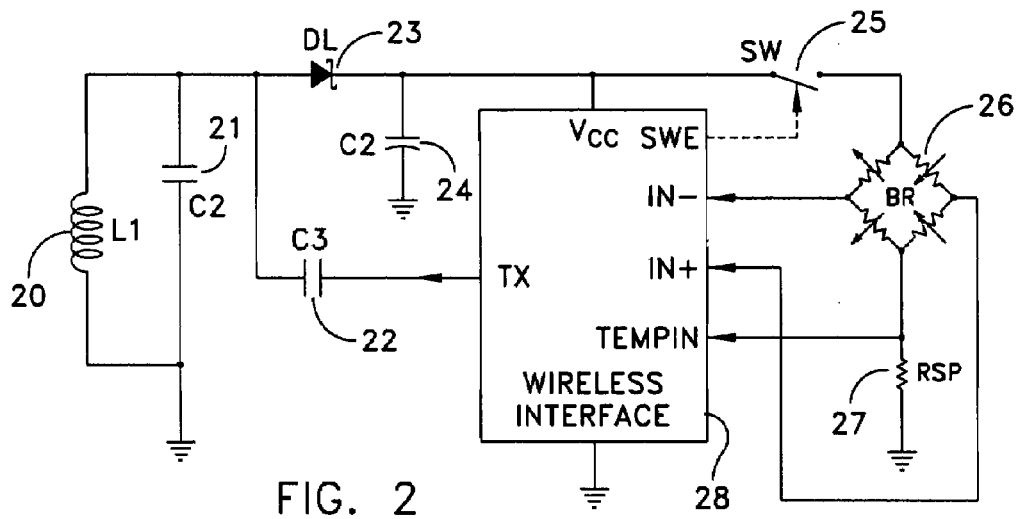
FIG. 2 is an embodiment of a transducer unit according to this invention.

Referring to FIG. 2, there is shown a transducer embodiment which would basically include the circuitry shown within the dashed line of FIG. 1. As seen, the tuned antenna of FIG. 2 consists of inductor 20 in parallel with capacitor 21. The inductor 20 can be a printed coil. The capacitor 21 and the inductor 20 form a resonant circuit at the operating frequency. The voltage developed at the tuned antenna is rectified by means of a microwave diode 23 which charges a capacitor 24. The capacitor 24 stores a DC voltage. This DC voltage is applied to the wireless interface circuit 28 as VCC. The wireless interface circuit 28 is a typical integrated circuit which can be provided by any number of integrated circuit suppliers/manufacturers. Essentially the wireless interface 28 can be a very simple microprocessor which operates to perform the following. As described and as explained in conjunction with FIG. 1 and FIG. 2 the function of the wireless interface 28 is to basically interface with the piezoresistive Wheatstone bridge 26. In a first mode the wireless interface will receive the biasing voltage from rectifier 24 and provide an operating voltage to switch 25. Thus the wireless interface 28 will operate the switch in a first mode whereby switch 25 will be closed and apply operating potential to the Wheatstone bridge 26. The wireless interface also receives the bridge outputs as shown on ports IN− and IN+. These outputs are converted by the interface into a digital signal which essentially can be used to modulate an RF carrier and to transmit the bridge output signal via capacitor 22 to the antenna consisting of the inductor 20 and capacitor 21. As on can see the wireless interface performs a relatively simple function which can be provided by many custom integrated circuits as well as special purpose integrated circuits. The DC voltage is also sufficient to operate switch 25 which closes when the interface detects a sufficient DC voltage on capacitor 24. Switch 25 when closed supplies operating potential to the Wheatstone piezoresistive bridge array 26. The supply to the bridge is applied to a span resistor 27 designated RSP, which provides a coarse temperature compensation of the temperature coefficient of the gage factor due to the temperature dependent bridge resistance. The voltage across resistor RSP is also digitized, as it indicates the temperature of the bridge. As one can see, the output from the bridge is applied to the wireless interface. The output of the bridge is digitized by an analog-to-digital converter, which is in the wireless interface. The analog-to-digital converter uses as the reference voltage the supply to the bridge. In this manner, variations of the bridge output due to variations in the supply voltage are eliminated.

As indicated above, the voltage across RSP is also directed to the wireless interface 28, which converts this voltage to a digital signal. The results of the analog-to-digital conversions are transmitted back to the monitoring station via the output indicated TX through capacitor 22. In FIG. 2 this is accomplished by modulating an RF signal at a frequency slightly different than the one transmitted by the monitoring station, but still within the resonant band of the transducer's antenna L1. The band width of the antenna is a function of the quality factor Q of the tuned circuit. The frequency that the transducer unit transmits to the monitoring station is slightly different than the received frequency. The receiver in the monitoring station demodulates the signal and retrieves the data. Therefore, from the received data the pressure and temperature of the sensor can then be calculated.

Figure 3:
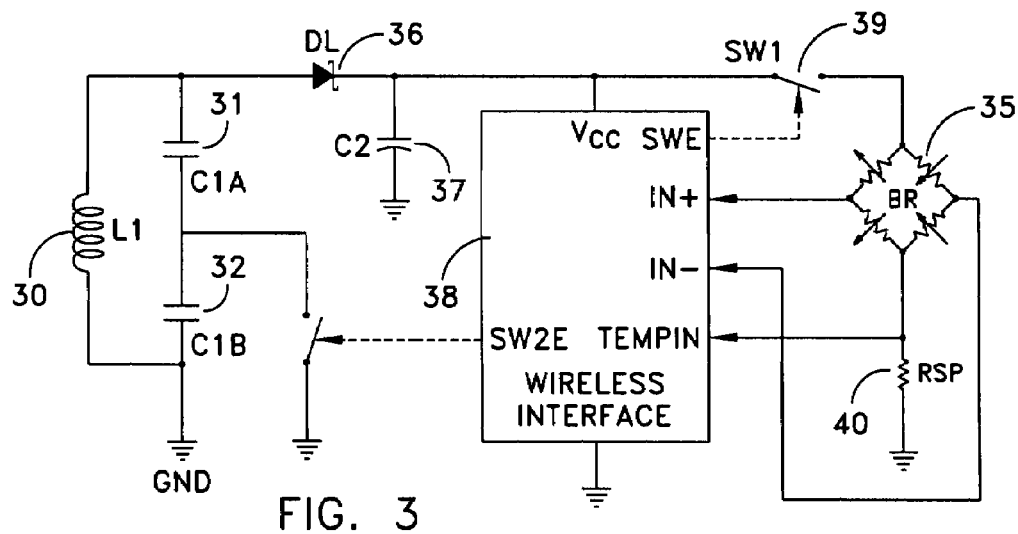
FIG. 3 is an alternate embodiment of a transducer unit according to this invention.

Referring to FIG. 3, there is shown an alternative embodiment of a transducer unit and method of transmitting data. As shown in FIG. 3, a tuned circuit consists of inductor 30, which is in parallel with capacitors 31 and 32. The center tap between capacitors 31 and 32 is coupled to a switch 33. Upon operation of switch 33, the tuned circuit of inductor 30 and capacitors 31 and 32 are detuned due to the fact that the switch 33, when operated, will short capacitor 32 to reference potential (GND) and therefore, the tuned circuit will now consist of inductor 30 and capacitor 31.

At the same time, in the monitoring station the receiver detects the back scattered signal. There is a significant difference in the back scattered signal between the tuned and the detuned states of the transducer's antenna. This difference is due to the fact that a tuned circuit absorbs much more energy than a detuned one and this is reflected in the level of the back scatter signal. By controlling the closing and opening of switch 33, such that it reflects the data to be transmitted, the information is conveyed to the monitoring station. The entire sequence supplies voltage to the bridge and the digitized transmitted data should be very short in order not to discharge capacitor C2 to an unacceptable low value. This cycle can be accomplished in a millisecond or less. The piezoresistive bridge, such as bridge 35, has a high resistance resulting in low current compensation. As seen in FIG. 3, the same exact concept basically operates with the exception of the transmission of data. In FIG. 3, the tuned antenna consisting of coil 30 and capacitors 31 and 32 are operative to receive the transmitted signal from the monitoring station. The diode 36 charges capacitor 37, whereby a suitable voltage is supplied to the wireless interface 38. This voltage operates switch 39 applying bias to the bridge circuit 35. The bridge circuit then produces an output voltage indicative of pressure. This output voltage is digitized and the digital signal is used to open and close switch 33, so that the effective data is conveyed to the monitoring system.

As one can ascertain, the RF signal transducer transmitted by the monitoring station, besides supplying the energy to the transducer, can also carry information needed to implement other functions. This information can be transmitted using any of the known modulation schemes. For example, AM, pulse, FM and using a corresponding demodulator at the transducer. The system described allows multiple sensors to be used in the same system. This is accomplished by modulating the RF signal transmitted by the monitoring station with the code corresponding to one individual transducer serial number in the system. All sensors in the system demodulate this code, but only one will then respond with its data. The monitoring system described above can also send a signal to the selected transducer. In return, the selected transducer will transmit its individual compensation data required to convert the voltage data to actual pressure and temperature. This compensation data can be embedded in each transducer when manufactured in a memory such as an electrically erasable programmable read only memory (EEPROM) in the form of several coefficients. The compensation coefficients can be retrieved only once when the system is turned on and then stored in the monitoring station. This function simplifies the replacement of a transducer without any changes in the monitoring station or logistic difficulties.

Another function that could be implemented by the system is automatic identification of all sensors connected to the monitoring station. This can be done by the monitoring station issuing a general broadcast code, and all transducers received in this code will respond by transmitting an acknowledged signal. The monitoring station can then selectively disable the acknowledge function of some transducers; for example, those devices whose first bit of the serial number is one. By scanning this way through all bits of the serial number, the monitoring system can automatically determine which transducers are connected in the system. Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A transducer adapted to respond to transmitted signals of a given frequency for providing a bias potential to said transducer and for enabling said transducer to transmit a transducer output signal to a remote location, comprising:

a radio antenna for receiving transmitted radio signals;

a rectifier circuit coupled to said antenna and operative to provide a DC operating voltage in response to said received radio signals;

a piezoresistive array operative to provide an output signal indicative of an applied pressure when said array is biased;

a switch coupled to said rectifier circuit and said array and operative in a first mode to apply said DC operating bias to said array, and operative in a second mode to remove said operating bias; and
an interface circuit coupled to said switch and said array and operating said switch in said first mode during the presence of received radio signals to cause said array to provide said output signal and apply said output signal to said antenna for transmission of said output signal to said remote locations, said interface circuit operative to operate said switch in said second mode when said transmitted radio signals are not received;
wherein, said interface circuit is further coupled to said rectifier circuit to receive an operating bias from said rectifier circuit.

2. The transducer according to claim 1 wherein said interface circuit monitors said rectifier output to operate said first switch in said first mode when said DC voltage exceeds a given value.

3. A transducer adapted to respond to transmitted signals of a given frequency for providing a bias potential to said transducer and for enabling said transducer to transmit a transducer output signal to a remote location, comprising:
  a radio antenna for receiving transmitted radio signals;
  a rectifier circuit coupled to said antenna and operative to provide a DC operating voltage in response to said received radio signals;
  a piezoresistive array operative to provide an output signal indicative of an applied pressure when said array is biased;
  a switch coupled to said rectifier circuit and said array and operative in a first mode to apply said DC operating bias to said array, and operative in a second mode to remove said operating bias;
  an interface circuit coupled to said switch and said array and operating said switch in said first mode during the presence of received radio signals to cause said array to provide said output signal and apply said output signal to said antenna for transmission of said output signal to said remote locations, said interface circuit operative to operate said switch in said second mode when said transmitted radio signals are not received; and
  a memory for storing conservation coefficients for said piezoresistive array.

4. The transducer according to claim 3 wherein said memory is an EEPROM.

5. A transducer adapted to respond to transmitted signals and transmit a transducer output signal to a remote location, comprising:
  an antenna for receiving transmitted signals;
  a rectifier circuit coupled to said antenna and operative to provide a DC operating voltage in response to said received transmitted signals;
  a Wheatstone bridge piezoresistive array comprising a span resistor and operative to provide an output signal indicative of an applied pressure when said array is biased;
  a switch coupled to said rectifier circuit and said array and operative in a first mode to apply said DC operating bias to said array, and operative in a second mode to remove said operating bias; and,
  an interface circuit coupled to said switch and said array and operating said switch in said first mode during the presence of received transmitted signals to cause said array to provide said output signal and apply said output signal to said antenna for transmission of said output signal to said remote locations, said interface circuit operative to operate said switch in said second mode when said transmitted signals are not received;
  wherein, said span resistor is coupled to said interface circuit to enable said interface circuit to convert a voltage across said span resistor into a radio frequency signal indicative of temperature.

6. A transducer adapted to respond to transmitted signals and transmit a transducer output signal to a remote location, comprising:
  a tuned circuit antenna comprising an inductor in parallel with a first and second capacitors in series with a common terminal between said capacitors for receiving transmitted signals;
  a rectifier circuit coupled to said antenna and operative to provide a DC operating voltage in response to said received transmitted signals;
  a piezoresistive array operative to provide an output signal indicative of an applied pressure when said array is biased;
  a first switch coupled to said rectifier circuit and said array and operative in a first mode to apply said DC operating bias to said array, and operative in a second mode to remove said operating bias;
  an interface circuit coupled to said switch and said array and operating said switch in said first mode during the presence of received transmitted signals to cause said array to provide said output signal and apply said output signal to said antenna for transmission of said output signal to said remote locations, said interface circuit operative to operate said switch in said second mode when said transmitted signals are not received; and,
  a second switch having a first terminal coupled to said common terminal of said antenna and another terminal coupled to a source of reference potential, wherein in a first mode said second capacitor is shorted by said second switch to cause said antenna to be tuned to a first frequency, and in a second mode said second switch is opened causing said first and second capacitors to tune said antenna to a second different frequency; said second switch being coupled to said interface circuit for controlling said second switch in said first or second modes.

7. The transducer according to claim 6 wherein said interface circuit operates said second switch to transmit transducer information to said remote location.

* * * * *